United States Patent
Laberge Lebel et al.

(10) Patent No.: US 10,391,721 B2
(45) Date of Patent: Aug. 27, 2019

(54) DEVICE AND METHOD FOR POSITIONING A PLY OF MATERIAL OF A COMPOSITE COMPONENT ALONG AN ARCUATE SURFACE

(71) Applicant: Bombardier Inc., Dorval (CA)

(72) Inventors: Louis Laberge Lebel, Montreal (CA); Matei Dragutescu, Montreal (CA); Paul Trudeau, St-Bruno (CA); Gaetan Normandin, Saint-Jean-sur-Richelieu (CA); Mouhcine Rifay, Montreal (CA)

(73) Assignee: BOMBARDIER INC., Dorval (CA)

( * ) Notice: Subject to any disclaimer, the term of this patent is extended or adjusted under 35 U.S.C. 154(b) by 239 days.

(21) Appl. No.: 15/127,097

(22) PCT Filed: Mar. 18, 2015

(86) PCT No.: PCT/IB2015/051994
§ 371 (c)(1),
(2) Date: Sep. 19, 2016

(87) PCT Pub. No.: WO2015/140738
PCT Pub. Date: Sep. 24, 2015

(65) Prior Publication Data
US 2018/0029313 A1  Feb. 1, 2018

Related U.S. Application Data

(60) Provisional application No. 61/955,292, filed on Mar. 19, 2014.

(51) Int. Cl.
*B29C 70/20* (2006.01)
*B29C 70/22* (2006.01)
(Continued)

(52) U.S. Cl.
CPC ............ *B29C 70/30* (2013.01); *B29C 70/205* (2013.01); *B29C 70/226* (2013.01);
(Continued)

(58) Field of Classification Search
CPC ........... Y10T 156/1028; Y10T 156/103; B29C 70/205; B29C 70/30; B29C 70/541; B29C 70/543; B29C 70/56
See application file for complete search history.

(56) References Cited

U.S. PATENT DOCUMENTS

| 4,744,846 | A | * | 5/1988 | Pflug | ....................... B29C 53/04 156/212 |
| 2012/0312459 | A1 | * | 12/2012 | De Mattia | ............... B29C 53/04 156/212 |

FOREIGN PATENT DOCUMENTS

| CN | 102301050 | 12/2011 |
| CN | 102333952 | 1/2012 |

(Continued)

OTHER PUBLICATIONS

Chinese Office Action dated Dec. 12, 2017.
(Continued)

*Primary Examiner* — Carson Gross
(74) *Attorney, Agent, or Firm* — Norton Rose Fulbright Canada LLP (57) ABSTRACT

A method and device of positioning a ply of material for a composite component along an arcuate surface are presented. The ply comprises two end portions and a plurality of fiber tows extending longitudinally between the two end portions. The arcuate surface has a curved edge and a planar surface extending from the curved edge. The method comprises placing a first longitudinal edge portion of the ply along the curved edge; and rotating at least one of the two end portions away from the arcuate surface about a pivot axis normal to the ply, so as to cause sliding of at least some (Continued)

of the plurality of fiber tows relative to each other, and substantial aligning of the plurality of fiber tows in a curved direction along the arcuate surface. A method of positioning a ply of material for a composite component onto a curved mandrel is also presented.

7 Claims, 9 Drawing Sheets

(51) Int. Cl.
*B29C 70/30* (2006.01)
*B29C 70/54* (2006.01)
*B29C 70/56* (2006.01)
*B29D 99/00* (2010.01)

(52) U.S. Cl.
CPC .......... *B29C 70/541* (2013.01); *B29C 70/543* (2013.01); *B29C 70/56* (2013.01); *B29D 99/0003* (2013.01); *Y10T 156/103* (2015.01); *Y10T 156/1028* (2015.01)

(56) References Cited

FOREIGN PATENT DOCUMENTS

| CN | 103419377 | 12/2013 |
| DE | 102012019958 | 4/2013 |
| EP | 2392714 | 7/2011 |
| WO | 2010/097657 | 9/2010 |

OTHER PUBLICATIONS

Laberge Lebel et al., Performing of a fuselage C-Shaped frame manufactured by Resin Transfer Molding, SAE International, published Sep. 17, 2013.

The State Intellectual Property Office of the People's Republic of China, Notification of Second Office Action dated Aug. 21, 2018 re: Chinese Patent Application No. 201580014788.4.

* cited by examiner

DEVICE AND METHOD FOR POSITIONING A PLY OF MATERIAL OF A COMPOSITE COMPONENT ALONG AN ARCUATE SURFACE

CROSS-REFERENCE TO RELATED APPLICATIONS

This application claims priority to U.S. application No. 61/955,292 filed Mar. 19, 2014, entitled "Device and Method for Positioning a Ply of Material of a Composite Component along an Arcuate Surface", the entire contents of which are incorporated by reference herein.

TECHNICAL FIELD

The application relates generally to the manufacture of composite components and, more particularly, to the positioning of composite plies along an arcuate surface during the manufacture of such composite components.

BACKGROUND OF THE ART

Airplane fuselages are examples of structures which are made from composite materials (a.k.a. composites). Composite materials are materials made from two or more constituent materials with significantly different physical or chemical properties, that when combined, produce a material with characteristics different from the individual components. To create a composite, several layers of material or plies may be used. Each layer may be of a multitude of fibers, which may be grouped in bundles known as tows. The layers may be different from one another in terms of material and/or orientation of its tows. However, the tows' orientations may restrict the possible shearing of the plies. For example, plies having longitudinally aligned tows (a.k.a. 0 degree plies) have limited to no stretch in the direction of the tows, and may not accommodate shearing over certain curvatures.

Traditionally, to accommodate more aggressive curvatures, a multitude of overlapping 0 ply sections are usually disposed adjacent to one another in a direction of the curvature, each section draping over a small section of the curvature. Drawbacks of this process include discontinuity of the reinforcing fibers, thickness build-up attributed to the overlapping plies, labor intensiveness and added weight to the component.

SUMMARY

In one aspect, there is provided a method of positioning a ply of material for a composite component along an arcuate surface. The ply comprises two end portions and a plurality of fiber tows extending longitudinally between the two end portions. The arcuate surface has a curved edge and a planar surface extending from the curved edge. The method comprises placing a first longitudinal edge portion of the ply along the curved edge; and rotating at least one of the two end portions away from the arcuate surface about a pivot axis normal to the ply, so as to cause sliding of at least some of the plurality of fiber tows relative to each other, and substantial aligning of the plurality of fiber tows in a curved direction along the arcuate surface.

In one aspect, the ply includes a plurality of bonds maintaining the plurality of fibre tows in an original position. The method further comprises breaking the at least some of the plurality of bonds in order to allow the fibre tows to slide in relation to each other when rotating the at least one of the two end portions.

In one aspect, the ply has a first shearing angle before rotating the at least one of the two end portions of the ply away from the arcuate surface. A resulting ply has the plurality of fiber tows substantially aligned in the curved direction has a second shearing angle larger than the first shearing angle after breaking the at least some of the plurality of bonds.

In one aspect, the curved edge is an outer curved edge. The arcuate surface has an inner curved edge, and the plurality of fiber tows is substantially aligned in the curved direction between the outer curved edge and the inner curved edge after rotating the at least one of the two end portions away from the arcuate surface.

In one aspect, the method further comprises clamping the at least one of the two end portions within a clamping unit before rotating the at least one of the two end portions. The clamping unit is operative for differential displacement of adjacent ones of the plurality of fiber tows within the ply along the curved direction.

In one aspect, the ply is a dry fabric.

In one aspect, wherein the pivot axis is aligned with the curved edge of the arcuate surface in the curved direction.

In one aspect, placing the first longitudinal edge portion of the ply along the curved edge comprises folding at least a portion of the ply over the arcuate surface thereby creating at least one bulge in the ply; and removing the at least one bulge as a result of rotating the at least one of the two end portions of the ply away from the arcuate surface.

In one aspect, the ply is a 0 degree ply.

In one aspect, the plurality of fibre tows comprises carbon fibres.

In one aspect, rotating the at least one of the two end portions away from the arcuate surface about the pivot axis normal to the ply comprises rotating the two end portions away from the arcuate surface each about a corresponding pivot axis normal to the ply.

In one aspect, the rotation is of between 6 and 20 degrees.

In one aspect, the arcuate surface has a radius of curvature of between 42 inches and 46 inches.

In one aspect, the method further comprises providing an extension of the fiber tows together with the rotation.

In one aspect, the extension of the fiber tows is provided by a clamp.

In one aspect, tows of the plurality of fiber tows closer to the inner curved edge undergo greater relative sliding than tows of the plurality of fiber tows closer to the outer curved edge.

In another aspect, there is provided a device for positioning a ply of material of a composite component along an arcuate surface. The ply comprises two end portions and a plurality of fiber tows extending longitudinally between the two end portions. The arcuate surface has a curved edge and a planar surface extending from the curved edge. The device comprises a curving unit including a clamp adapted to clamp an end portion of the ply when a first longitudinal edge portion of the ply is placed along the curved edge, and a base supporting the clamp. The base is rotatable about a pivot axis normal to the base between a first position and a second position. Rotation about the pivot axis is operative to cause sliding of at least some of the plurality of fiber tows relative to each other, and substantial aligning of the plurality of fiber tows in a curved direction along the arcuate surface.

In one aspect, the curving unit is disposed at an end of the arcuate surface.

In one aspect, the arcuate surface defines a plane parallel to a plane containing the base.

In one aspect, the arcuate surface is planar and curved in a curved direction. The arcuate surface has an outer longitudinal edge and an inner longitudinal edge in the curved direction. The pivot axis is aligned with the outer longitudinal edge in the curved direction.

In one aspect, the curving unit further comprises a handle actuating the clamp and transmitting the rotation to the base.

In one aspect, the first and second positions form an angle comprised between 6 and 20 degrees.

In one aspect, a stopper bounding a travel of the base in the second position.

In one aspect, a position of the second position relative to the first position is dependent at least in part on a shape of the support.

In yet another aspect, there is provided a method of positioning a ply of material for a composite component onto a curved mandrel. The ply has a plurality of fiber tows extending longitudinally between opposed end portions of the ply. The mandrel has two opposed curved faces and a planar arcuate face disposed therebetween. The method comprises placing a first portion of the ply onto one of the curved faces of the mandrel with the plurality of fiber tows of the ply aligned longitudinally with the curved direction of the mandrel; at least partially folding a second portion of the ply adjacent to the first portion of the ply over the planar arcuate face of the mandrel and placing a longitudinal edge portion of the ply along a longitudinal edge common to the one of the curved faces and the planar arcuate face; and rotating opposed end portions of the second portion of the ply away from the planar arcuate face about a pivot axis normal to the ply and aligned with the longitudinal edge portion of the ply in the curved direction so as to cause sliding of at least some of the plurality of fiber tows in the curved direction relative to each other, substantial aligning of the plurality of fiber tows in a curved direction along the arcuate surface, and folding the second portion of the ply onto the planar arcuate face of the mandrel.

In one aspect, folding a third portion of the ply adjacent to the second portion onto the other one of the curved faces of the mandrel as a result of rotating the opposed end portions of the second portion of the ply.

In one aspect, the ply includes a plurality of bonds maintaining the plurality of fibre tows in an original position, the method further comprising breaking the at least some of the plurality of bonds in order to allow the fibre tows to slide in relation to each other when rotating the opposed end portions.

In one aspect, the ply has a first shearing angle before rotating the opposed end portions. A resulting ply having the plurality of fiber tows substantially aligned in the curved direction has a second shearing angle larger than the first shearing angle after breaking the at least some of the plurality of bonds.

In one aspect, the longitudinal edge of the mandrel is an outer longitudinal edge. The planar arcuate face has an inner longitudinal edge. The plurality of fiber tows is substantially aligned in the curved direction between the outer longitudinal edge and the inner longitudinal edge.

In one aspect, the method further comprises clamping the opposed end portions within corresponding clamping units before rotating the opposed end portions. The clamping units are operative for differential displacement of adjacent ones of the plurality of fiber tows within the ply along the curved direction.

In one aspect, the ply is a dry fabric.

In one aspect, placing the first longitudinal edge portion of the ply along the longitudinal edge of the mandrel comprises placing the first longitudinal edge portion of the ply along the longitudinal edge of the mandrel thereby creating at least one bulge in the ply, and removing the at least one bulge as a result of as a result of rotating the opposed end portions of the ply away from the planar arcuate surface.

In one aspect, the ply is a 0 degree ply.

In one aspect, the plurality of fibre tows comprise carbon fibres.

In one aspect, the rotation is of between 6 and 20 degrees.

DESCRIPTION OF THE DRAWINGS

Reference is now made to the accompanying figures in which.

DETAILED DESCRIPTION

Figure 1:
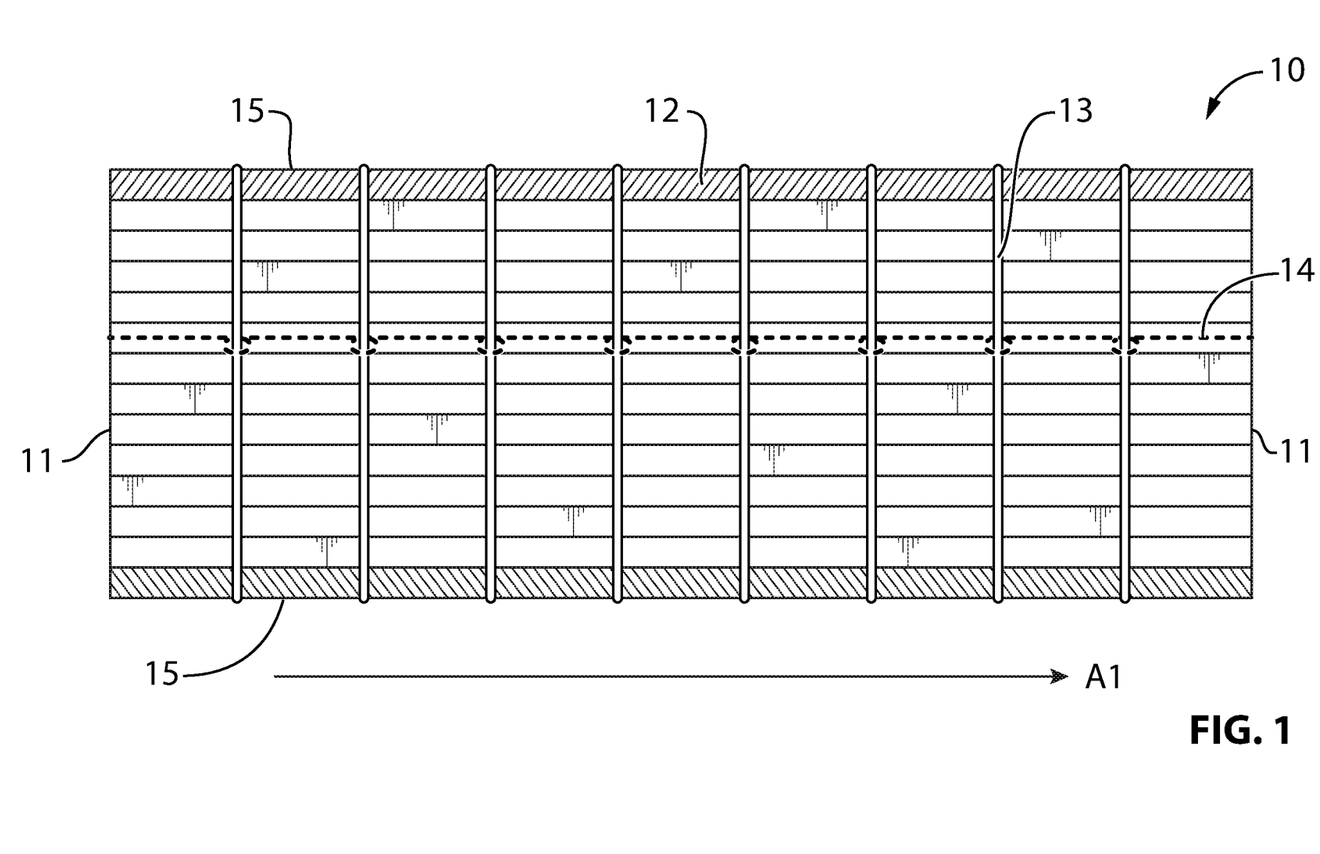
FIG. 1 is a schematic view of a planar 0 degree ply.

Referring to FIG. 1, a non-limiting example of a planar (or flat) straight non-crimp ply 10 to be used in the manufacture of a composite component is shown. In one non-limiting example, the ply 10 can be used in the formation of a composite component of an airplane, as will be described in more detail below.

The ply 10 is a dry fabric made of a plurality of fiber tows 12 (one fiber tow 12 being shown shaded) held together by a plurality of bonds, which in the non-limiting example of FIG. 1 include stiches 14 (only one line of stitching 14 being shown) and stabilizing yarns 13. The ply 10 shown in FIG. 1 is a unidirectional 0 degree ply, i.e. all the fiber tows 12 are aligned in a common longitudinal direction A1. It should be understood that in the construction of a composite component for an airplane, many different fabric plies are layered one on top of the other in order to generate the thickness of the composite component. The different fabric plies may include fibres positioned at different orientations. For example, the composite component may be formed of some 0 degree plies, as shown in FIG. 1, some 90 degree plies and some 45 degree plies, for example. It should be appreciated that plies having fibres at other orientations, such as 30 degrees or 60 degrees, among other orientations, may also be used. When manufacturing a composite component, it is the 0 degree plies that impart the component with most of its strength. More specifically, the 0 degree plies strengthen the composite component in a direction of the fiber tows 12. In some cases, 0 degree plies may be selected to form a composite component having a load going through a centre part of the composite component.

As shown in FIG. 1, the ply 10 has two longitudinal edges 15 and two opposed end portions 11. Each fiber tow 12 may comprise a plurality of fibers. A carbon tow may, for example, comprise approximately 12000 carbon fibers. The fiber tows 12 could each have ⅛ inch width, however, other widths are also possible without departing from the scope of the present invention. The fiber tows 12 may or may not be of a same material. The ply 10 may have one or more layers of fiber tows 12 through its thickness. The stitches 14 are yarns sewn within the tows 12 to keep the fiber tows 12 in alignment, and hence the fibres in alignment. The stitches 14 may have varying degrees of looseness which may allow more or less shearing of the ply 10. Stitches 14 in 0 degree plies such as the ply 10 are usually tight and the shearing of the ply 10 is usually limited. The stitches 14 shown in FIG. 1 are warp stitches, but it is contemplated that the stitches 14 could be knitted stitches or other types of stitches.

The stabilizing yarns 13 are used to help keep the shape of the ply 10. The stabilizing yarns 13 may be glued by a binder to the surface of the fiber tows 12. The stabilizing yarns 13 may be made of a different material than that of the fiber tows 12 and may be disposed at an angle with respect to the fiber tows 12. In the non-limiting embodiment shown in FIG. 1, the stabilizing yarns 13 are shown aligned with a direction perpendicular to the longitudinal direction A1, but it is contemplated that the stabilizing yarns 13 could be at an angle other than 90 degrees with the longitudinal direction A1. For example, the stabilizing yarns 13 could be at 45 degrees with the longitudinal direction A1.

In one embodiment, the fiber tows 12 are made of carbon fibers, the stabilizing yarns 13 of glass fibers, and the stitches 14 of polyester. However, other materials for the ply 10 may be contemplated and would be known to a person of skill in the art. For example, the fiber tows 12 could be made of Kevlar or glass or quartz fibers, and/or the stabilizing yarns 13 could be made of carbon fibers. Carbon is one example of material that has limited to no stretch in the longitudinal direction A1. Combined with the relative tightness of the stitches 14, a 0 degree ply 10, such as that shown in FIG. 1, may have a limited drapeability on certain curved structures. The fiber tows 12, as well as the fibres within the fiber tows 12, may in such cases have difficulty shearing in relation to each other, i.e. there may be limited sliding movement of the fiber tows 12 in relation to each other, such that the ply has difficulty draping, or otherwise conforming properly, to a curved surface. For example, a ply 10 with limited drapeability may have a 5 degree shearing angle (i.e. manufacturability limit of the ply 10) and not be able to be manually draped over a given length of a curved structure without bulging or wrinkling, which creates an unacceptable component.

As a non-limiting example, the 0 degree ply 10 is contemplated for use in the formation of a C-frame that is used to frame an aircraft fuselage. Aircraft C-frames can have a variety of different shapes and often require plies of material that are used to form composite C-frames to conform to tight curves. 0 degree plies provide strength to a composite component, and it is desirable that a single sheet of a 0 degree ply can form one of the layers of the composite component, instead of having to cut and splice the 0 degree ply into a plurality of overlapping segments to conform to a specific curvature. Having a single 0 degree ply as opposed to a plurality of spliced sections of a 0 degree ply may provide better strength and less material wastage. In order to be able to have a single 0 degree ply form one layer of the composite component when the composite component is curved, such as in the case of a C-frame, the 0 degree ply may in some cases be sheared beyond its manufacturing limit by hand lay-up.

Although a particular ply is shown in FIG. 1, it is contemplated that the ply 10 could be a variety of plies. For example, instead of a dry fabric, the ply 10 may be a pre-preg ply. The term "pre-preg" is known in the art, and refers to a ply of material that is at least partially pre-impregnated with some resin. In another example, the ply 10 may include a dry binder. In yet another example, the ply 10 may have multidirectional fiber tows. It is contemplated that the bonds holding the plurality of fiber tows 12 in a predetermined direction could vary depending on the type of ply 10. Should the ply 10 be a pre-preg, the bonds would be the resin.

Figure 2:
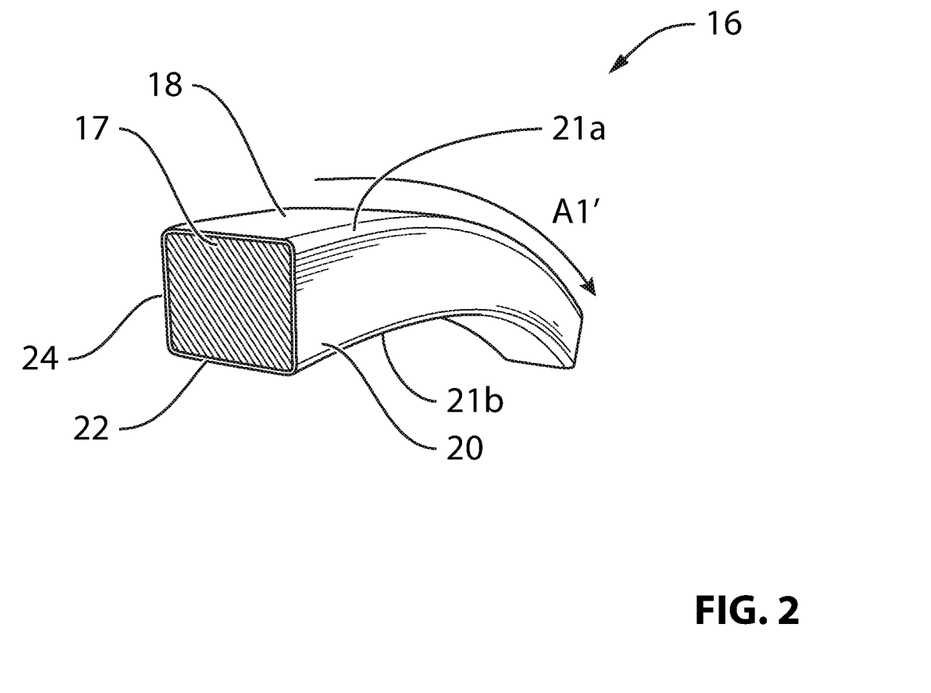
FIG. 2 is a schematic tridimensional view of a curved mandrel.

In accordance with a non-limiting method of manufacture of composite C-frames, one or more plies of material are placed around a mandrel that imparts to the plies the eventual shape of the C-frame. Shown in FIG. 2, is a non-limiting example of a curved mandrel 16 that can be used to drape one or more plies, such as ply 10, therearound in order to later form a preform of a composite component, such as a C-frame used within an aircraft. The mandrel 16 is curved along a curved direction A1'. The mandrel 16 shown herein has a square cross-section 17 with rounded corners, but it is contemplated that the mandrel 16 could have various cross-sections and shapes. For example, the mandrel 16 could have a variable cross-section along its length, or could have a variable curvature. In another example, the mandrel 16 could be S-shaped. In the non-limiting example shown in FIG. 2, the mandrel 16 has outer 18 and inner 22 curved faces having a rectangular shape and two opposed planar faces 20, 24 each having an arcuate shape. In a non-limiting example, the arcuate face 20 provides an arcuate surface with a radius of curvature comprised between 42 inches and 46 inches. The arcuate face 20 may be more or less large depending on the composite component to be formed.

Figure 3:
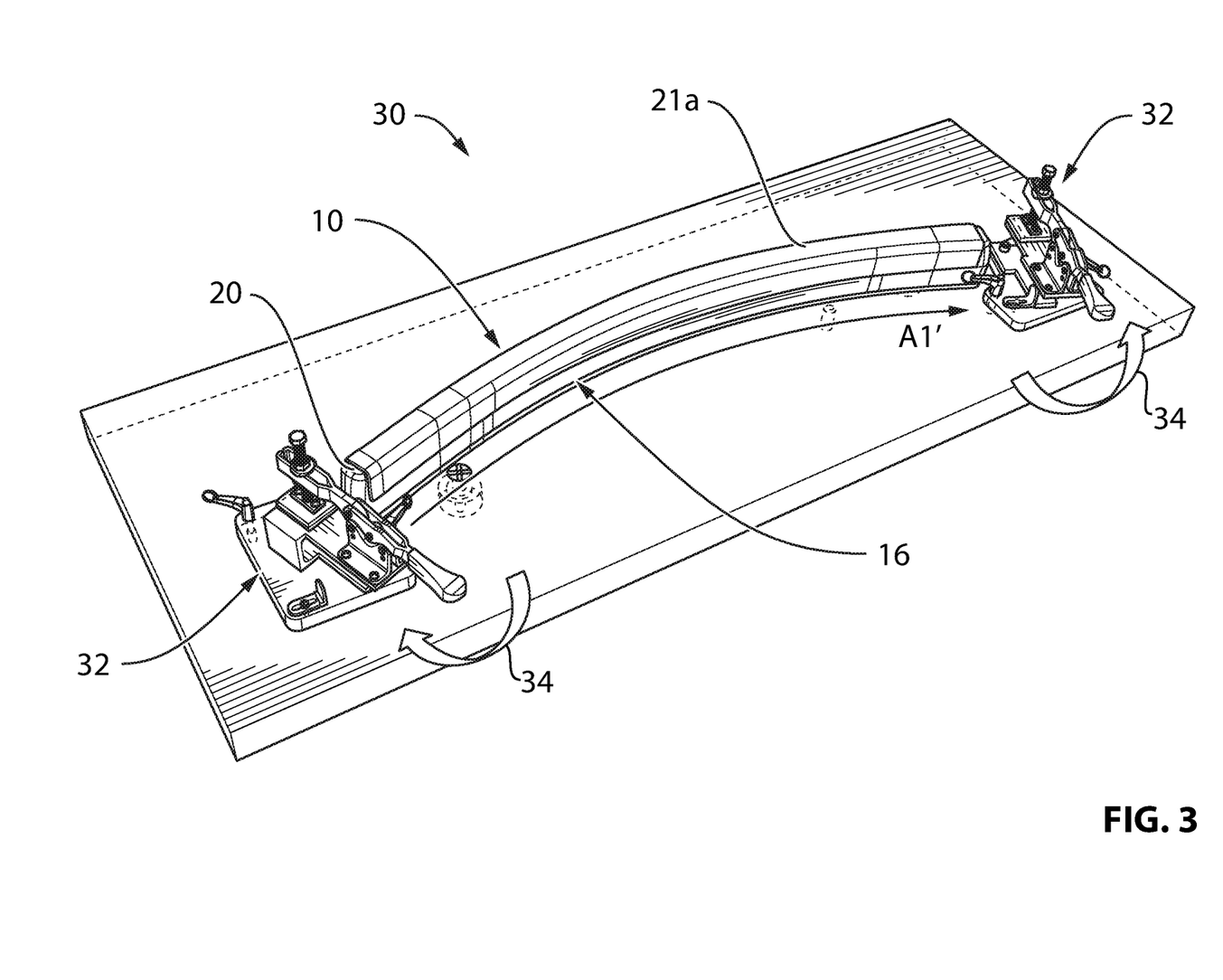
FIG. 3 is a schematic tridimensional view of a curving device for imparting a curved shape to planar 0 degree plies such as the one of FIG. 1.

Turning to FIG. 3, a non-limiting example of a curving device 30 for positioning the ply 10 along at least one of the arcuate surfaces defined by the planar arcuate faces 20, 24 of the mandrel.

To form a preform of a composite component, the ply 10 may be draped over the mandrel 16. As shown in FIG. 3, the ply 10 is typically first placed adjacent to the outer curved face 18 of the mandrel 16. Minimal to no shearing of the ply 10 is required in order to lay the ply 10 flat on the outer curved face 18. The ply 10 may then be folded onto the planar arcuate face 20. The planar arcuate face 20 has an outer longitudinal edge 21a, and an inner longitudinal edge 21b. A length of the inner longitudinal edge 21b is smaller than a length of the outer longitudinal edge 21a. Excess material may appear when draping a straight planar ply such as the ply 10 onto a planar curved support such as the planar arcuate face 20 of the mandrel 16. The difference in the shape of the ply 10 (straight) and the shape of the arcuate face 20 (arcuate) combined with the substantially non stretchability and relative small shearing of the ply 10 results in the ply 10 not lying flat onto the planar arcuate face 20 and instead forming a bulge, an example of which is shown in FIG. 8b. The curving device 30 allows shearing of the ply 10, such that the tows 12 (and possibly the fibres within the tows 12) are able to slide in relation with each other in order to form the ply 10 into a planar curved ply 10' (best seen in FIGS. 6b and 6c). More specifically, the ply 10 is sheared so as to eliminate the bulge or excess material that typically forms when the straight ply is folded over the curved edge of the arcuate face 20, such that the ply 10 is able to conform to the planar arcuate face 20. The shearing undergone by the ply 10 is obtained by relative sliding of the fiber tows 12. The curving device 30 may provide a resulting ply 10' (best seen in FIGS. 6b and 6c) having a shearing angle larger than the manufacture shear angle of the ply 10. As such, the ply 10' can be sheared beyond a designated manufacturability limit of the ply 10 by the curving device 30.

Still referring to FIG. 3, the curving device 30 includes two curving units 32 each disposed at respective ends of the planar arcuate face 20 of the mandrel 16. The curving units 32 clamp the ply 10 once the ply 10 has first been placed against curved surface 18 and folded over the outer longitudinal edge 21a of the planar arcuate face 20. As such, the clamping units 32 are clamping at a desired location on the end portion 11 of the ply 10. Each curving unit 32 clamps an end portion 11 of the ply 10 and forces that end portion 11 into a rotation (illustrated by arrow 34) away from the planar arcuate face 20. It is also contemplated that instead of two curving units 32, the curving device 30 could include only one curving unit 32 at one end of the ply 10 while another end of the ply 10 would be held fixed. The mandrel 16 may be temporarily fixed by drawing vacuum thereunder or by mechanical means. For example, clips or temporary screws could keep the mandrel 16 is a desired position.

Figure 4:
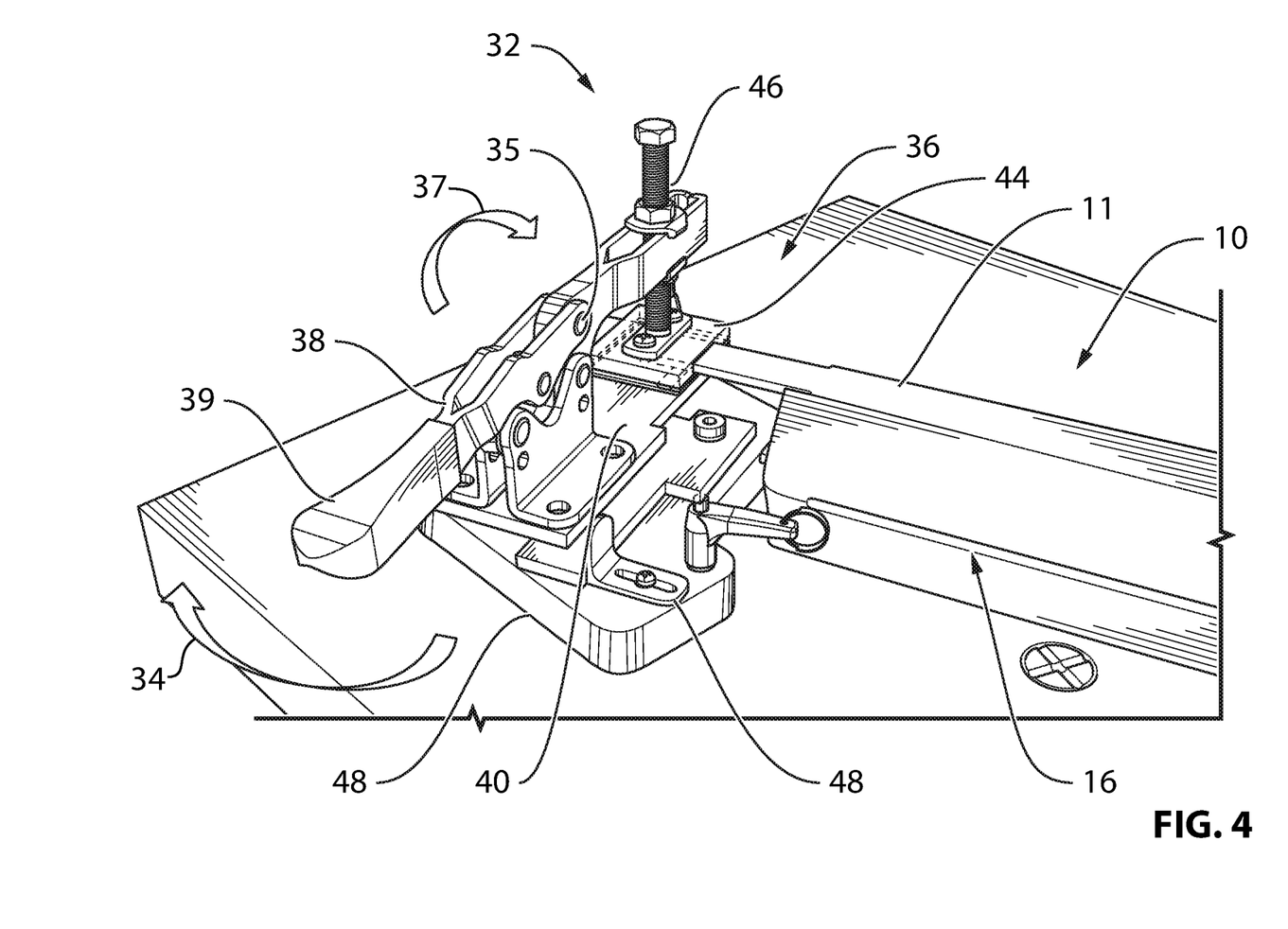
FIG. 4 is an enlarged tridimensional view of a curving unit of the curving device of FIG. 3.
Figure 5:
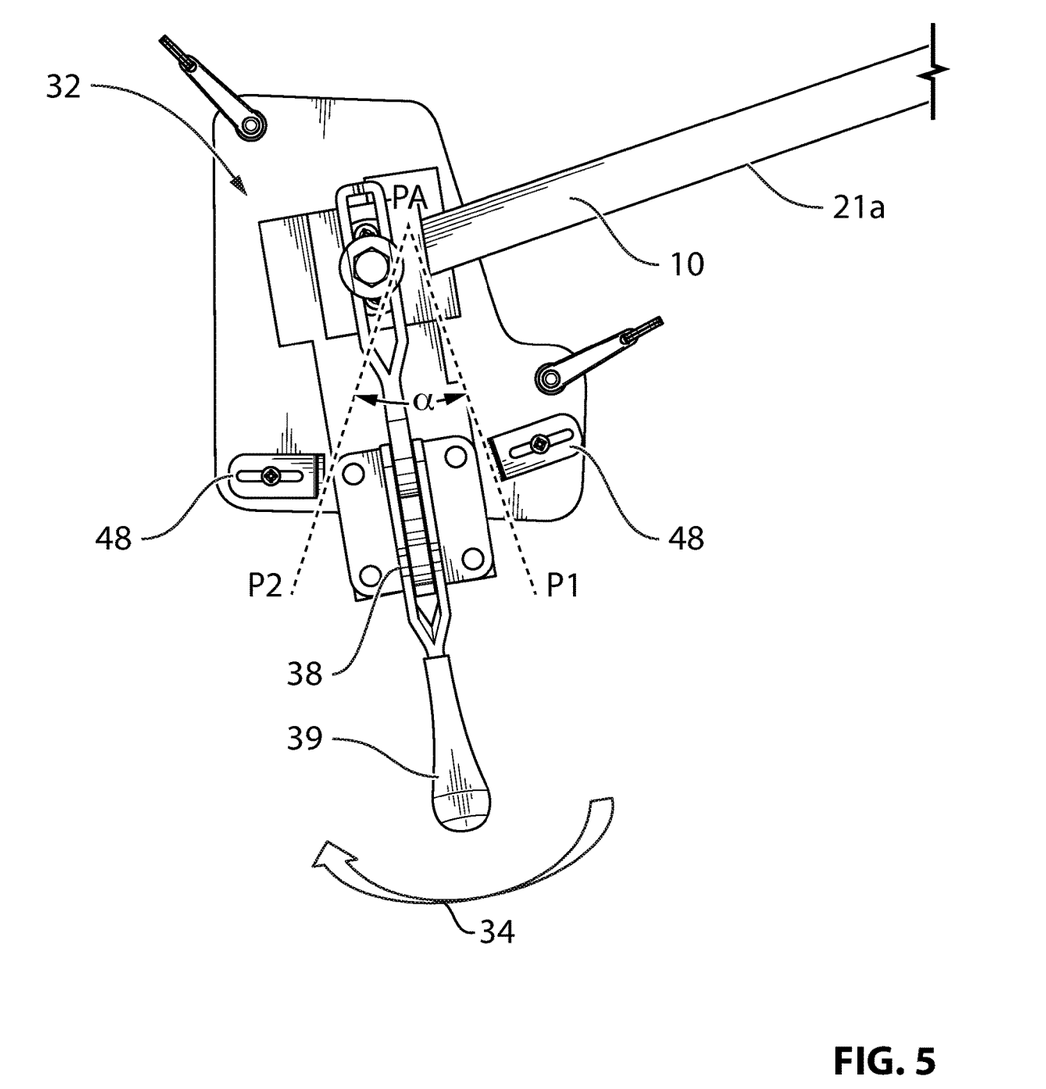
FIG. 5 is a top view of the curving unit of FIG. 4.

Referring to FIGS. 4 and 5, in a particular embodiment, each curving unit 32 includes a clamp 36 and a lever 38. The clamp 36 and lever 38 are mounted onto a base 40 which is rotatable relative to the mandrel 16 about a pivot axis PA. In the particular embodiment shown in FIGS. 4 and 5, the pivot axis PA is fixed, but it is contemplated that some curving units 32 may be designed to have a pivot axis PA that is movable. The lever 38 actuates the clamp 36 but also allows a user to grab it for rotating the base 40 about the pivot axis PA. The clamp 36 includes a tab 44 and a screw 46 extending normally therefrom. The screw 46 cooperates with a threaded portion (not shown) of the lever 38 to adjust a position of the tab 44 relative to the lever 38. The tab 44 is movable by the lever 38 at a pivot point 35 between a first position where the tab 44 is away from the base 40, and a second position where the tab 44 is abutting the base 40 thereby sandwiching the end portion 11 of the ply 10 (see arrow 37). It is contemplated that other configurations of clamps 36 could be used to hold the end portion 11 of the ply 10. For example, the clamp 36 could be pneumatically actuated. The clamp 36 should produce enough force to hold the end portion 11 during rotation of the clamp 36. In some cases, a wedge could be used to further secure the end portion 11 of the ply in position. The lever 38 includes a handle 39 which a user can grip to impart the rotational movement to the end portion 11 of the ply 10 and to lift up and down the tab 44.

An amplitude of rotation of the curving unit 32 is restricted by two abutment members or stoppers 48 which bound a travel of the base 40 between first and second positions P1, P2. The first position P1 corresponds to a position before shearing, and the position P2 to a position after shearing. An angle α between the first and second positions P1, P2 is determined to ensure than the ply 10' has undergone the desired curving. The angle α may depend on the curvature of the mandrel 16, length of the mandrel 16, and the inherent characteristics of the ply 10. For example, for the same ply 10 but with a mandrel having a small radius of curvature, a larger angle α will be considered to account for the tighter curvature of the mandrel. In another example, for the same mandrel 16 but for a ply having more shearing capabilities, a smaller angle α will be considered. In one particular embodiment, the angle α is comprised between 6 and 20 degrees.

In the particular embodiment shown in the Figures, and particularly FIG. 5, the pivot axis PA is disposed in alignment with the outer longitudinal edge 21a of the planar arcuate face 20 of the mandrel 16 in the curved direction A1'. The location of the pivot axis PA is determined to ensure removal of the bulge and thereby draping of the ply 10 onto the planar arcuate face 20. However, depending on the application, the pivot axis PA may be disposed elsewhere relative to the mandrel 16 and the ply 10. When draping the ply 10 over the planar arcuate face 20 of the mandrel 16, a tow of the ply 10 is first aligned with the outer longitudinal edge 21a of the planar arcuate face 20. Aligning the pivot axis PA with the outer longitudinal edge 21a allows aligning the pivot axis PA with an originating point of the bulge in the curved direction A1'. As a consequence, as will be described below, as the curving units 32 are being rotated away from the ply 10 about such pivot axis PA, the bulge is reduced and in some cases removed due to the sliding of the tows 12 (and their fibres) in relation to each other. It is contemplated that the curving unit 32 could be actuated between the positions P1 and P2 by a servomotor instead of being manually actuated, and that the stoppers 48 could be omitted. It is also contemplated that the curving unit 32 could include only one stopper 48.

Figure 6A:
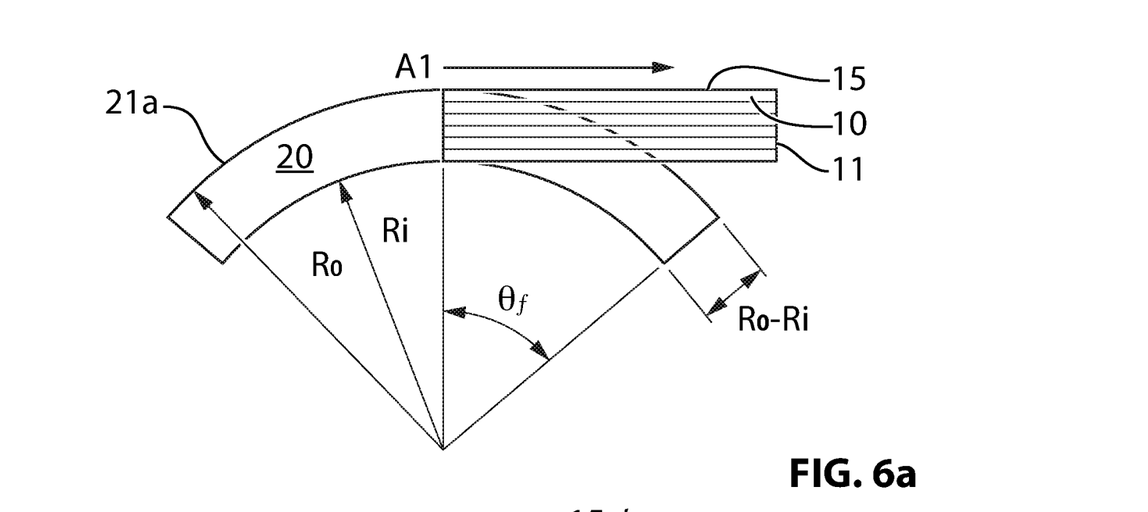
FIG. 6a is a schematic of the 0 degree ply of FIG. 1 shown superimposed with a target curved shape.
Figure 6B:
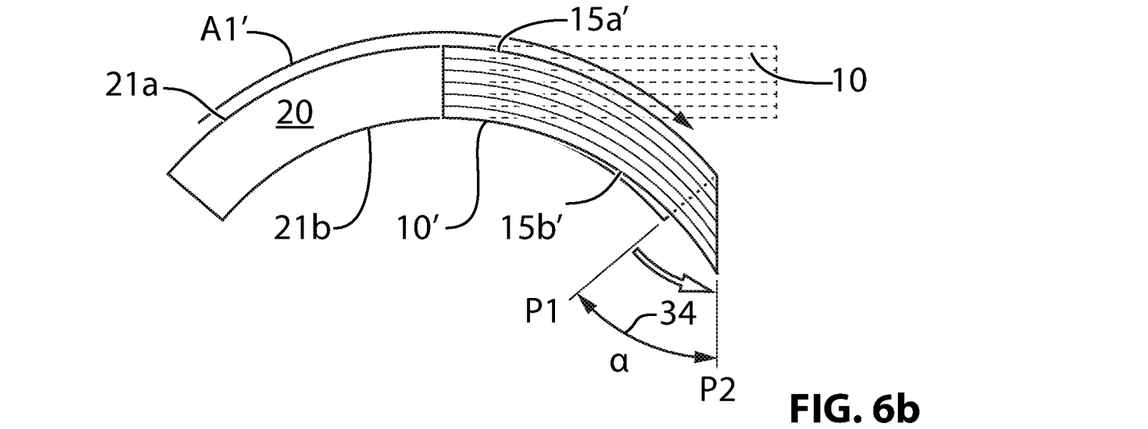
FIG. 6b is a schematic of the 0 degree ply of FIG. 1 shown having been curved by the curving device of FIG. 3.
Figure 6C:
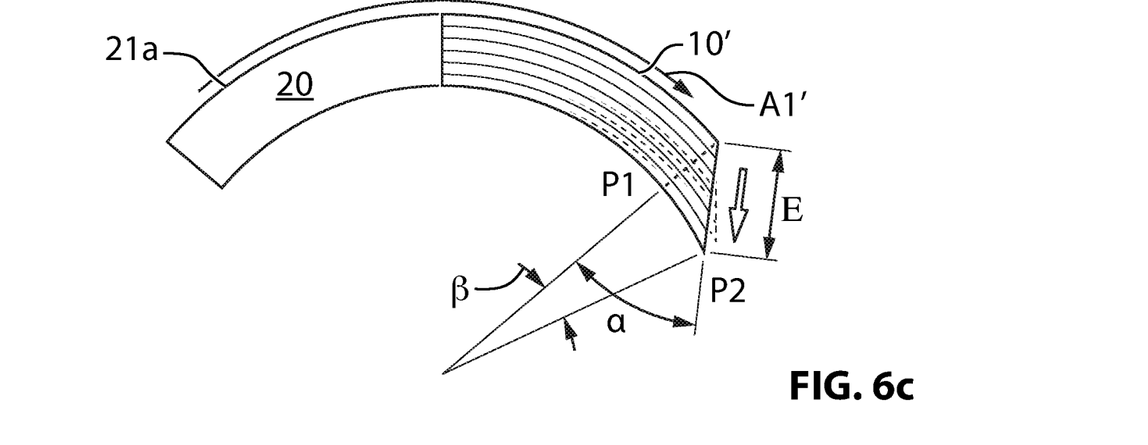
FIG. 6c is a schematic of an alternative shearing of the 0 degree ply of FIG. 1.

Turning to FIGS. 6a to 6c, the ply 10 is shown before (FIG. 6a) and after (FIGS. 6b and 6c) rotation by the curving units 32 that causes the ply 10 to conform to the shape of the planar arcuate face 20 of the mandrel 16. The ply 10 has been curved into the ply 10' (only half the plies 10 and 10' being shown) after the curving units 32 imparted a rotation of the angle α to the end portions 11 of the ply 10. FIG. 6a shows half of the ply 10 disposed onto the face 20 of the mandrel 16. In FIGS. 6b and 6c, one of the tows 12 of the ply 10 is aligned onto the outer longitudinal edge 21a of the arcuate face 20. As the curving units 32 rotate the end portions 11 away (arrow 34), the ply 10 gradually deforms into the ply 10'. The ply 10' has an outer longitudinal edge 15a' and an inner longitudinal edge 15b', both curved in the curved direction A1'. The shearing undergone by the ply 10' is achieved by the sliding of the fiber tows 12 with respect to each other. The breaking of some of the stitches 14 by the rotational force imparted by the curving units 32 allows relative sliding of the fiber tows 12 with each other. As a result, the ply 10 undergoes a shearing that is beyond its manufacturability shearing angle limit calculated with the stitches 14 intact. The shearing due to the rotation of angle α causes a differential displacement between the fiber tows 12 close to the pivot point PA and the fiber tows 12 away from the pivot axis PA. More specifically, the tows 12 located in proximity to the inner longitudinal edge 15b' will undergo greater displacement/shearing relative to their adjacent tows 12, than tows 12 located in proximity to the outer longitudinal edge 15a'. Given that the outer longitudinal edge 15a' of the arcuate face 20 has a greater length than the inner longitudinal edge 15b' of the arcuate face, this greater displacement of the tows 12 located in proximity to the inner longitudinal edge 15b', results in a portion of these tows 12 extending over the edge of the mandrel 16. Once the portion of the tows 12 that extend past the mandrel 16 have been trimmed or cut, the length of the tows 12 located along the inner longitudinal edge 15b' will be shorter than the length of the tows 12 located along the outer longitudinal edge 15a'. Thus, the tows 12 are not being "stretched" by the curving units 32, they are instead being differentially pulled and curved, such that they are able to shear in relation to each other so as to lie in a curved plane along the arcuate face 20.

As mentioned above, shearing gradually increase from almost no shearing for the fiber tows 12 close to the outer longitudinal edge 15a', which undergo almost no displacement along the curved direction A1', to a larger shearing for the tows 12 close to the inner longitudinal edge 15b' which undergo a larger displacement along the curved direction A1'.

As best seen in FIG. 6b, the shearing imparted to the ply 10 by the curving units 32 allows keeping the fiber tows 12 substantially aligned with one another. After shearing, the tows 12 are aligned in the curved direction A1'. Because the fiber tows 12 substantially keep their alignment, the ply 10' may have similar strength as that of the ply 10 before shearing. Having unitary fiber tows 12 along the curved direction A1' may provide a greater strength to the composite component than a plurality of spliced tows or sections of ply 10 that overlap each other along the curved direction A1'.

While fiber tows 12 substantially keep their alignment, there may, however, be some compression of the fiber tows 12 in a direction perpendicular to the curved direction A1' due to the fact that the shearing by the curving unit 32 includes solely a rotation. For smaller angles α, as shown in FIG. 6b, this compression of the fiber tows 12 is minimal and the fiber tows 12 have an acceptable alignment in terms of keeping properties similar to that of the ply 10. For larger angles α, however, the compression may become unacceptable. In a non-limiting example, an acceptable angle α, with which compression of the fiber tows 12 is minimal, is comprised between 6 and 20 degrees. In a non-limiting example, an angle α with which compression of the fiber tows 12 may be unacceptable is above 20 degrees. This large angle α may correspond to a compression of 7% in width of the ply 10 between the ply 10' after rotation having compressed the fiber tows 12 in the direction perpendicular to the curved direction A1', and an equivalent ply after rotation having uncompressed the fiber tows 12 in the direction perpendicular to the curved direction A1'

To remedy to the compression, an extension E could be added to the rotation by the angle α (see FIG. 6c) in order to compensate for the compression and to recover alignment of the fiber tows 12. The extension E may be expressed as:

$$E = \frac{R_i \sin\beta}{\sin\alpha},$$

where β, is the angle of the arc length difference between the positions P1 and P2 calculated on an inner radius Ri of the planar arcuate face 20. The angle β can be expressed as $$\beta = \theta_f \left(\frac{R_o}{R_i} - 1\right),$$

where θf is a half-span of the planar arcuate face 20 (related to the length of the mandrel 16), and Ro an outer radius of the face 20. The angle α can be approximated using the inner Ri and outer Ro radii as $$\alpha = \arctan\frac{R_i \sin\beta}{R_o - R_i \cos\beta}.$$

One example of achieving the extension E, includes having a comb integrated with the clamp 36 so as to keep the fiber tows 12 in alignment in between teeth of the comb.

The curving device 30 may be used on the different plies 10 described above. Should the ply 10 be coated with a powder binder (e.g. epoxy), a connection between the binder and some of the stabilizing yarns 13 may also be broken by the rotation movement of the curving unit 32. Should the ply 10 be a pre-preg without stitches 14, the bonds holding the fiber tows 12 together would in this case be the resin, and the resin would at some places disconnect or at least loosen up to allow sliding of the fiber tows 12 in the curved direction A1'. Should the ply 10 be a pre-preg with stitches 14, the resin impregnating the ply and some of the stitches may loosen up to allow sliding of the fiber tows 12 in the curved direction A1'. The breaking of some of the bonds, whether they are stitches, stabilizing fibers or resin, allows relative sliding of the fiber tows 12.

Figure 7:
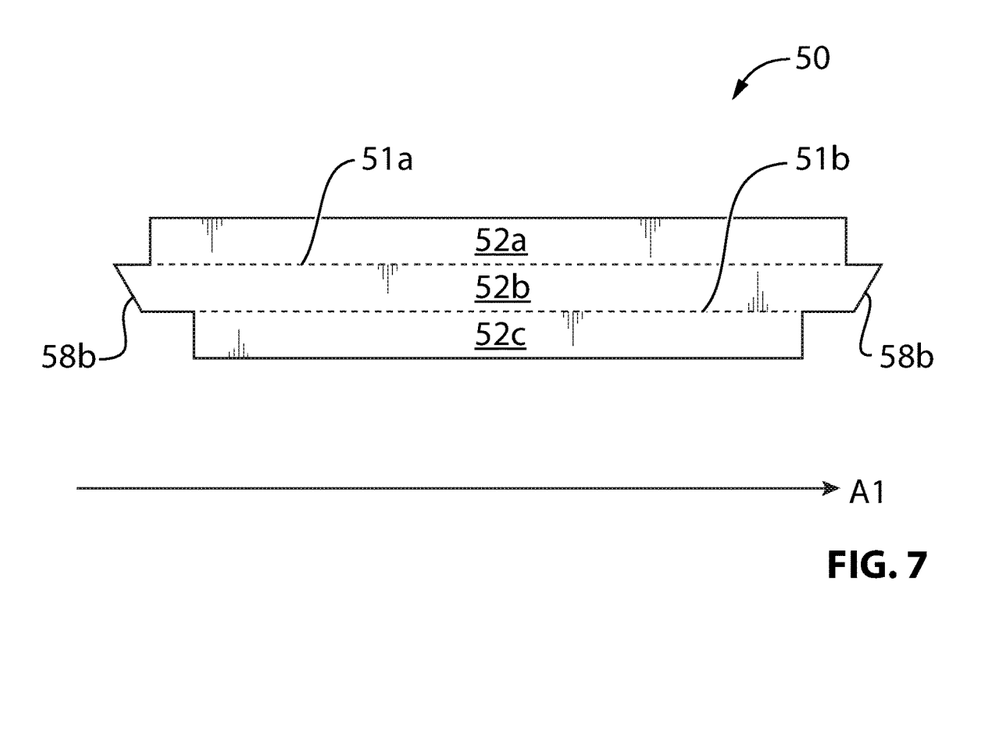
FIG. 7 is a pattern made of the 0 degree ply of FIG. 1.

Turning now to FIG. 7, a ply pattern 50 made of a 0 degree ply such as the ply 10 is cut to be draped around the mandrel 16 using the curving device 30. The ply pattern 50 is only one example of a pattern that could be draped around the mandrel 16 using the curving device 30.

The ply pattern 50 includes three portions, namely portions 52a,b,c, adapted to be draped around respective faces 18, 20, 22 of the mandrel 16. The portions 52a,b,c are shown in FIG. 7 using a phantom line for ease of comprehension, but it is understood that the ply pattern 50 is unitary and that, in this particular embodiment, there is no delimitation or separation between the portions 52a,b,c. The first portion 52a is to be draped around the outer curved face 18 of the mandrel 16, and as such is longer than the third portion 52c to be draped around the inner (and thus smaller) curved face 22 of the mandrel 16. The fiber tows 12 of the first portion 52a may not need to shear in relation to each other. The second portion 52b is longer than the first and third portions 52a,c and is the portion that will undergo the curving in order to conform without bulging to the planar arcuate face 20 of the mandrel 16. End portions 58b of the second portion 52b are beveled, but it is contemplated however that the end portions 58b could be straight. Dimensions of the portions 52a,b,c in a direction perpendicular to the longitudinal direction A1 match those of the respective faces 18, 20, 22 of the mandrel 16. In the embodiment shown herein, the portion 52a,c have a length matching that of the respective curved faces 18, 22. The ply pattern 50 is chosen to enable curving of the second portion 52b. As such, the second portion 52b is slightly longer than the other portions 52a,c to allow the end portions 58b of the second portion 52b to be clamped in the curving units 32. The ply pattern 50 is adapted to drape over the faces 18, 20, 22 of the mandrel 16.

Figure 8A:
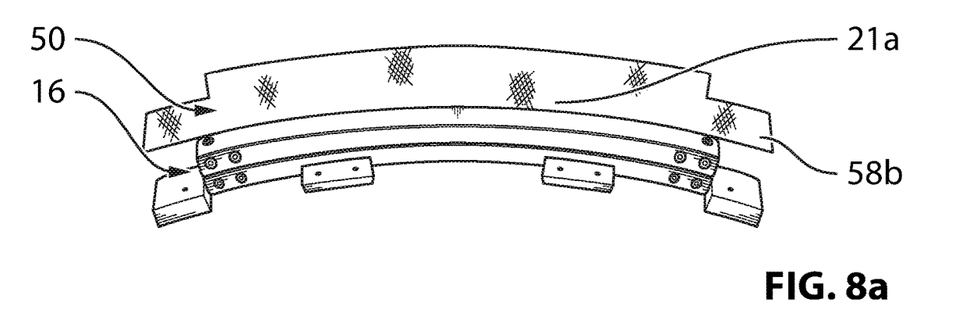
FIG. 8a is an illustration of a first step of draping the pattern of FIG. 7 around the mandrel of FIG. 2.
Figure 8B:
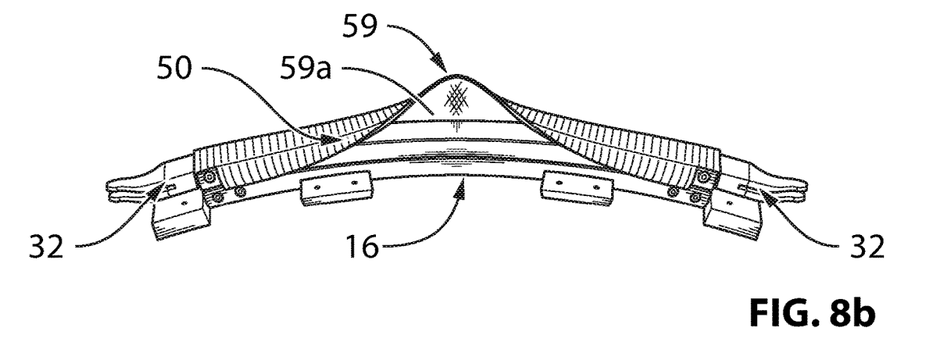
FIG. 8b is an illustration of a second step of draping the pattern of FIG. 7 around the mandrel of FIG. 2.
Figure 8C:
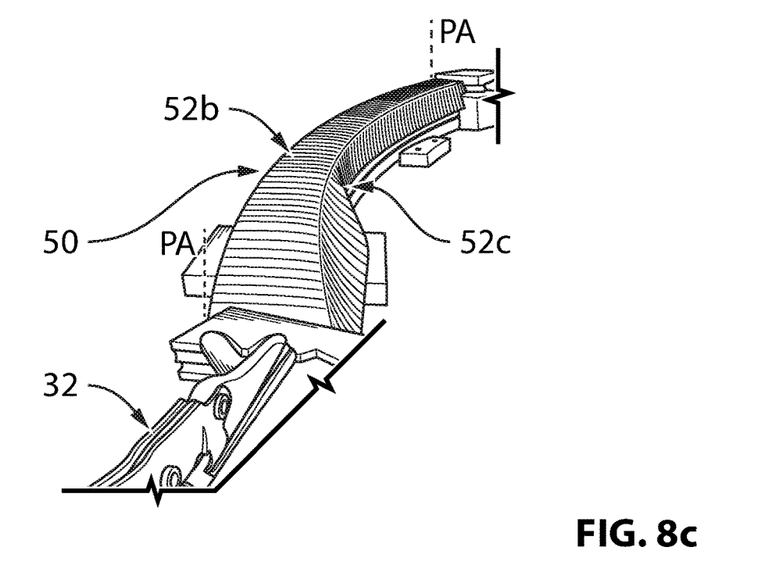
FIG. 8c is an illustration of a third step of draping the pattern of FIG. 7 around the mandrel of FIG. 2.
Figure 9:
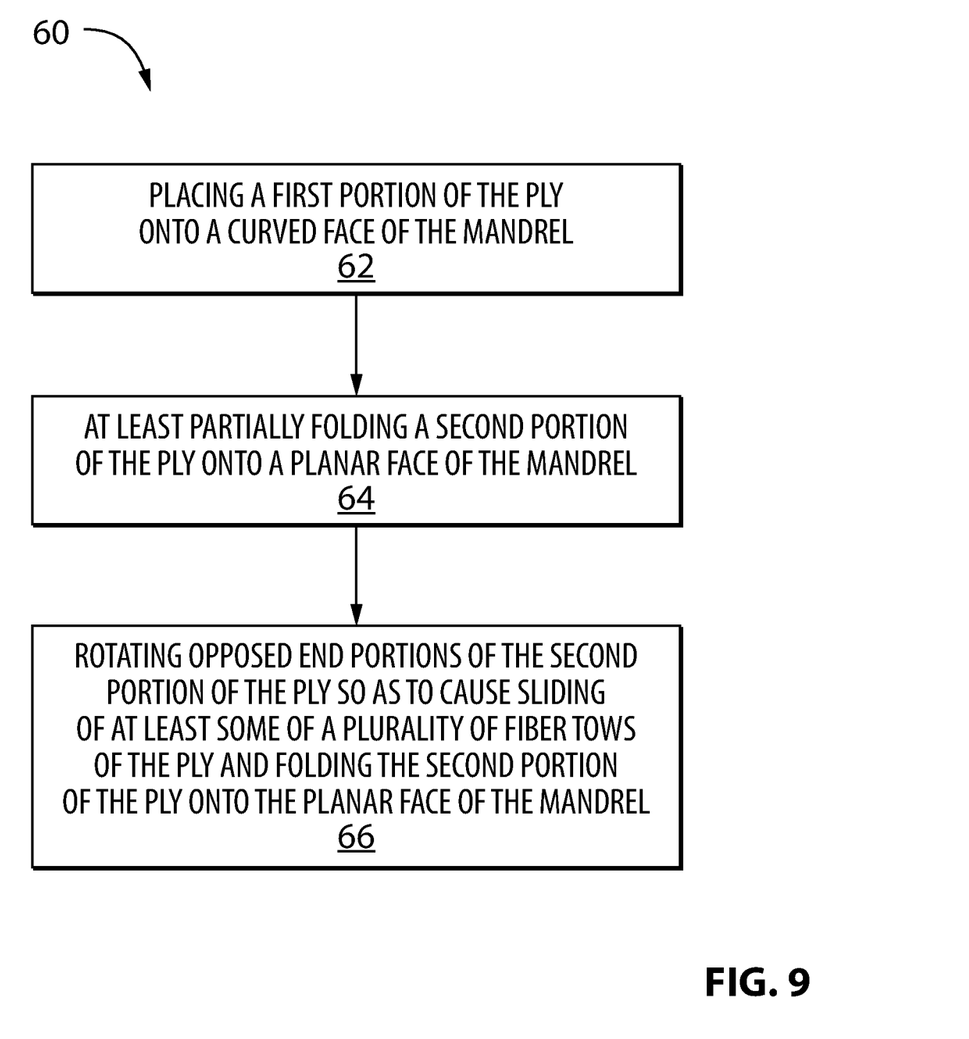
FIG. 9 is a flow chart of a method of positioning a ply of material such as the 0 degree ply of FIG. 1 along a curved surface.

Referring to FIGS. 8a to 9, a method 60 of draping the ply pattern 50 over the mandrel 16 will now be described.

The method 60 starts at step 62 with the first portion 52a of the ply pattern 50 being placed over the outer curved face 18 of the mandrel 16 (best shown in FIG. 8a). The plurality of fiber tows 12 of the ply pattern 50 is aligned with the curved direction A1' of the mandrel 16. The outer curved face 18 and the first portion 52a have similar shapes and dimension, such that the positioning of the first portion 52a of the ply pattern 50 against the outer curved face 18 is achieved with almost no deformation (i.e. stretching, shearing) of the ply pattern 50 (or tows within the ply). At the end of step 62, the first portion 52a lays flat onto the outer curved face 18 of the mandrel 16.

From step 62, the method 60 goes to step 64, which comprises at least partially folding the second portion 52b of the ply pattern 50 over the outer longitudinal edge 21a of the mandrel 16 to lay partially against the planar arcuate face 20 of the mandrel 16. As indicated above, this initial folding of the ply pattern 50 may cause bulging as shown in FIG. 8b. An outer longitudinal edge portion 51a of the second face 52b of the ply pattern 50 is placed along the outer longitudinal edge 21a of the planar arcuate face 20 of the mandrel 16. To ensure that the first portion 52a does not move on the mandrel 16 during that operation, the first portion 52a may be temporarily fixed to the mandrel 16, for example, by tapes. Because the planar arcuate face 20 of the mandrel 16 has a planar arcuate shape and the tows of, the ply pattern 50 are linearly arranged, a central bulge 59 occurs having an originating point 59a on the longitudinal edge portion 51a of the second face 52b. In order to remove the bulge 59 and allow the second portion 52b to lie flat onto the planar arcuate face 20 of the mandrel 16, ends 58b of the second portion 52b are each clamped in a corresponding curving unit 32 for rotation 34 about their corresponding pivot axes PA in a direction away from the mandrel 16. It is contemplated that depending on the ply pattern 50, there could be more than one bulge and that the bulges may not be disposed centrally.

From step 64, the method 60 goes to step 66, where the end portions 58b of the ply pattern 50 are rotated about pivot axes PA by the curving units 32. As the curving units 32 rotate the end portions 58b away, the fiber tows 12 of the ply pattern 50 slide with respect to each other. The breaking of some of the stitches 14 renders the fiber tows 12 partially free which allow relative sliding with each other. The fiber tows 12 close to the outer longitudinal edge 21a undergo almost no displacement along the curved direction A1', while fiber tows 12 close to the inner longitudinal edge 21b undergo a larger displacement along the curved direction A1'. As shown in FIG. 8c, the pivot axes PA are disposed at the ends 58b in alignment with the longitudinal edge 21, i.e. aligned with the originating point 59a of the central bulge 59 (seen in FIG. 8b) along the curved direction A1'. By rotating the ends 58b about the pivot axis PA away from the bulge 59, the second portion 52b is sheared to conform to the planar arcuate face 20 of the mandrel 16 (i.e. a deformed shape of the second portion 52b matches that of the planar arcuate face 20 of the mandrel 16). The curving device 30 induces a breaking of some of stitches 14 as the ends 58b are rotated and a sliding of the fiber tows 12 of the second portion 52b relative to each other. As a result of the end portions 58b of the ply pattern 50 being rotated about their pivot axes PA, the second portion 52b becomes folded onto the planar arcuate face 20 of the mandrel 16 with the fiber tows 12 of the second portion 52b substantially aligned in the curved direction A1'. This shearing also results in a partial and in some cases total draping of the third portion 52c flat onto the inner curved face 22 of the mandrel 16 as the second portion 52b is being draped onto the planar arcuate face 20. It is contemplated that an additional step to the method could include folding the third portion 52c flat onto the inner curved face 22 of the mandrel 16.

The ply 10 described herein has a generally low drapeability due to the non-stretchability of the carbon tows 12, the tight warp stitches 14 and the presence of stabilizing yarns 13. When binder is applied on the ply 10, the binder becomes partially impregnated in the ply 10 and bonds the stabilizing yarns 13 to the unidirectional tows 12. The presence of the binder may reduce even more the drapeability of the ply 10. The curving device 30 described herein is a clamp-and-rotate device which shears the fiber tows 12 such that they are better able to conform to a flat arcuate surface and at the same time keep the orientation of the tows 12. Because the fiber tows 12 remain substantially aligned with each other in a curved direction, the structural properties of the deformed ply 10' may be similar to those of the undeformed ply 10. With the above method of curving a 0 degree ply, a single sheet of 0 degree ply can be used to cover a flat arcuate surface having a more or less aggressive curvature instead of several overlapping ply sections. The above reduces an amount of work and time needed to drape a single arcuate surface. In addition, the reduction in material also reduces the weight of the overall composite component. The use of the curving device 30 assists in a controlled, repeatable and precise curving of the ply 10 which in turn reduces rejection rates. The curving device 30 may be used with plies other than the 0 degrees plies, such as 45 degree or 90 degree plies. These plies may have a greater ability to drape over curved surfaces and the curving device 30 may be used with a smaller angle of rotation a than for the 0 degree plies.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A device for positioning a ply of material of a composite component along an arcuate surface, the ply comprising two end portions and a plurality of fiber tows extending longitudinally between the two end portions, the arcuate surface having a curved edge and a planar surface extending from the curved edge, the device comprising:

two curving units, each curving unit being disposed at opposed ends of the arcuate surface and including:
a clamp adapted to clamp an end portion of the ply when a first longitudinal edge portion of the ply is placed along the curved edge; and
a base supporting the clamp, the base being rotatable about a pivot axis normal to the base between a first position and a second position, wherein rotation about the pivot axis is operative to cause:
rotating of the two opposed end portions of the ply, each about the corresponding pivot axis normal to the ply;
sliding of at least some of the plurality of fiber tows relative to each other; and
substantial aligning of the plurality of fiber tows in a curved direction along the arcuate surface.

2. The device as defined in claim 1, wherein the arcuate surface defines a plane parallel to a plane containing the base.

3. The device as defined in claim 1, wherein the arcuate surface is planar and curved in a curved direction;
the arcuate surface has an outer longitudinal edge and an inner longitudinal edge in the curved direction; and
each pivot axis is aligned with the outer longitudinal edge in the curved direction.

4. The device as defined in claim 1, wherein the curving unit further comprises a handle actuating the clamp and transmitting the rotation to the base.

5. The device as defined in claim 1, wherein the first and second positions form an angle comprised between 6 and 20 degrees.

6. The device as defined in claim 1, further comprising a stopper bounding a travel of the base in the second position.

7. The device as defined in claim 1, wherein a position of the second position relative to the first position is dependent at least in part on a shape of a support.

* * * * *